United States Patent [19]

Ward

[11] 3,925,903
[45] Dec. 16, 1975

[54] REDUCING THE MOISTURE CONTENT OF A FOODSTUFF BY IMMERSING A FROZEN FOODSTUFF IN THANOL MAINTAINED AT A TEMPERATURE IN THE RANGE OF −20° TO 0°C

[75] Inventor: James Patrick Ward, Rushden, England

[73] Assignee: Lever Brothers Company, New York, N.Y.

[22] Filed: Mar. 9, 1973

[21] Appl. No.: 339,797

[30] Foreign Application Priority Data
Mar. 17, 1972 United Kingdom............... 12615/72

[52] U.S. Cl. ..................... 34/9; 426/429; 426/444;
62/64; 34/5
[51] Int. Cl........ A23b 7/02; A23b 1/04; A23b 3/04
[58] Field of Search ........... 426/425, 426, 429, 524, 426/444, 384, 385, 424; 34/9, 5; 62/64

[56] References Cited
UNITED STATES PATENTS

| | | | |
|---|---|---|---|
| 2,750,295 | 6/1956 | Treadway | 426/426 |
| 3,049,430 | 8/1962 | Anderson | 426/426 |
| 3,143,425 | 8/1864 | Muller | 426/429 |

*Primary Examiner*—A. Louis Monacell
*Assistant Examiner*—Martin G. Mullen
*Attorney, Agent, or Firm*—James J. Farrell, Esq.

[57] ABSTRACT

A method for the dehydration of foodstuffs is provided which gives a substantially unshrunkened product of open texture, like that obtained by the relatively expensive procedure of freeze drying. In the method, the frozen foodstuff is immersed in ethanol maintained at a temperature in the range of −20°C to 0°C in order to extract moisture from its interior by solution in the ethanol. Immersion of the foodstuff in the ethanol is carried out with the foodstuff in the frozen state.

2 Claims, No Drawings

REDUCING THE MOISTURE CONTENT OF A FOODSTUFF BY IMMERSING A FROZEN FOODSTUFF IN THANOL MAINTAINED AT A TEMPERATURE IN THE RANGE OF −20° TO 0°C

This invention relates to the dehydration of foodstuffs, for example meat and vegetables.

In the most commonly used method of dehydration, a current of air is passed over the foodstuff in the form of chunks or dice, and this gradually removes moisture from the material until the required low level of moisture content (below about 10% by weight) is attained. The method is cheap, but it suffers from the disadvantage that the pieces of foodstuff become case-hardened as drying proceeds. Moreover, particularly when warm air is used to accelerate drying, the foodstuff shrinks irreversibly, with the result that rehydration gives a product whose texture does not closely resemble that of the original raw material.

Dehydrated foodstuffs of much better quality can be obtained by freeze-drying. In this method, pieces of the foodstuff in the frozen state are subjected to a pressure reduced very much below that of the atmosphere, so that frozen moisture sublimes off. Freeze-dried foodstuffs are not case-hardened, and have a porous open structure which allows rapid rehydration to a texture which closely resembles that of the original raw material. Freeze-drying is, however, an expensive method to operate.

The present invention provides a dehydration method which, while cheaper to run than freeze-drying, is nevertheless capable of yielding a dehydrated product that is as good as that obtained by freeze-drying. The method of the invention depends on the use of ethanol (ethyl alcohol) to extract water from the foodstuff to be dried.

The use of ethanol to extract water when drying foodstuffs has already been proposed. Thus, U.S. Pat. 3,211,559 discloses a meat dehydration process, carried out within the range of ordinary room temperature, in which the meat in the form of fairly small pieces (for example: shrimps, or chunks of fresh pork) is immersed in ethanol at ambient temperature until, after 4 − 24 hours, the ethanol will dissolve out no more water from the meat. The meat is then separated from the ethanol/water mixture formed, and the operations of immersion in ethanol and separated from the ethanol/water mixture formed are repeated twice to remove further water from the meat. The meat is finally dried to 2 − 12% by weight moisture content by a current of warm air, which evaporates residual solvent and associated moisture. However, the product obtained is visibly shrunken, and the quality of the material obtained on rehydration is not as good as that of a rehydrated freeze-dried product.

British Patent Specification No. 1,032,204 discloses a process for the dehydration of fish, meat, vegetables, coffee beans, bread or other foodstuff by immersing the foodstuff in the unfrozen state in ethanol which is at a temperature of −30°C or below, so that the foodstuff is cooled and part of its water content is dissolved out and replaced by ethanol. Immersion of the foodstuff in ethanol at this low temperature causes quick internal cooling without, however, resulting in the foodstuff's becoming frozen. The cooled unfrozen foodstuff is separated from the liquid phase and is then contacted with a current of dry air to remove residual ethanol and water by evaporation. However, as the experiment reported towards the end of this specification demonstrates, the removal of water by ethanol at −30°C or below is very slow indeed.

The present invention provides an improvement in the method of drying a foodstuff by immersing it in ethanol in order to extract moisture from its interior by solution in the ethanol. According to the invention, immersion of the foodstuff in the ethanol is carried out with the foodstuff in the frozen state, and the temperature of the mixture of foodstuff and ethanol is kept in the range −20°C to 0°C until at least half the moisture content of the foodstuff has been dissolved from it.

Preferably, the foodstuff is at a temperature in the range −20° to −5°C when it is immersed in the ethanol.

When, according to the invention, the foodstuff is in the frozen state at the time when it is immersed in the ethanol, its structure is rigid enough to permit relatively rapid loss of moisture to the ethanol without appreciable shrinkage occurring, provided that during immersion its temperature is kept low. When once the major part, that is, at least half, of its contained moisture has been dissolved out below 0°C, the risk that shrinkage will occur on removal of further moisture at temperatures above freezing is very much reduced; and accordingly, after the loss of half its moisture to the ethanol, dissolution by ethanol of the remainder of the moisture content can be allowed to proceed with the moisture in the form of liquid water rather than of ice; that is, dissolution of moisture can proceed under much less stringent conditions of temperature control. Thus, the temperature of the mixture of foodstuff and ethanol may be allowed to rise to ambient temperature; and a second, third or further immersion in fresh ethanol to dissolve out more moisture can be carried out with the foodstuff at ambient temperature on immersion.

We have observed that the rate at which ethanol dissolves moisture from the frozen foodstuff is greater if the procedure employed in freezing the foodstuff is a 'slow' one, for example freezing in relatively still air (as in a freezer cabinet at −20°C) as distinct from quick-freezing by a blast of cold air or by putting the foodstuff between freezer plates. This difference is probably related to the difference in size of the ice crystals formed in the foodstuff by the slow and quick freezing operations: slow-freezing produces larger ice crystals in the foodstuff.

When the method of the invention is applied to the drying of raw vegetables, for example raw potatoes, it is desirable that at the time of first immersion the temperature of the ethanol itself should be below 0°C, in order to avoid enzymic browning of the vegetable tissue. In treating other frozen foodstuffs, however, the temperature of the ethanol at immersion may be as high as 10° or even 20°C, provided that upon immersion the mixture of frozen foodstuff and ethanol is agitated efficiently enough to bring the temperature quickly down to 0°C or below.

The proportion of ethanol required for immersion of the frozen foodstuff will ordinarily be at least 2 liters ethanol: 1 kg of foodstuff. By employing a larger proportion of ethanol, loss of moisture from the foodstuff can of course be accelerated. The frozen foodstuff should occasionally be stirred in the ethanol, and continuous agitation is preferred.

The foodstuff is best allowed to remain immersed in the ethanol until a state of equilibrium has been attained, that is, until the extraction of moisture by ethanol has practically ceased. The time required for this will depend on the nature of the foodstuff and its dimensions; for example, at −5°C slices of frozen bacon about 3.5 mm thick reach the state of equilibrium within 3 – 5 minutes, while frozen raw steaks some 3 cm thick can take up to about 2 hours or even longer to reach a similar state at −5°C. At equilibrium, the moisture content of the foodstuff will normally have fallen to about 20 – 30% by weight. Further drying can as already indicated be carried out by immersion at ambient temperature in fresh ethanol, and this can be followed by evaporation of the bulk of the residual ethanol from the foodstuff.

Immersion in ethanol is in fact preferably continued until the moisture content of the foodstuff has fallen to less than about 10% by weight, and residual ethanol and associated moisture are then preferably evaporated in a current of air. The temperature of the current of air should normally not exceed 100°C and is preferably no higher than 80°C. With raw foodstuffs it is advantageous to use a current of air at ambient temperature (for example 20°C) or air at or near 0°C. Evaporation of residual ethanol can also be carried out under a partial vacuum.

Ethanol can be recovered by known procedures from the ethanol/water mixtures formed by ethanol extraction of water from the foodstuff.

The invention, which can be used for dehydrating raw or cooked meat, fish, vegetables and fruits, is further illustrated by the following Examples.

EXAMPLE 1

This Example illustrates the dehydration of cooked chicken meat.

The cleaned carcasses of end-of-lay hens were boiled for 4 hours so that meat and bones were easily separated from one another. After draining, cooling and skinning, the meat (both light and dark) was roughly cut into dice of about 2 cm side, and frozen in still air at −20°C.

The pieces of frozen chicken meat were then totally immersed in ethanol of a degree of purity acceptable for food treatment (British Pharmacopoeia rectified spirit, containing about 10% by weight of water) at room temperature (15°C). For complete immersion, about 2 liters of ethanol were required for each kilogram of meat. On stirring, the temperature of the ethanol fell rapidly to about −4°C, and this temperature was maintained for 1 hour, at the end of which time the moisture content of the ethanol has reached a substantially constant value (estimated by hydrometer) of about 25% by weight. The chicken meat, now of reduced moisture content (25% by weight, by contrast with an original moisture content of about 70% by weight) was removed from the ethanol, allowed to drain for 5 minutes, and then — this time at room temperature, instead of in the frozen state — totally immersed in a further 2 liters of 90% ethanol at room temperature. At the end of 1 hour equilibrium had been reached, with the moisture content in each phase at about 15% by weight. The meat was again removed and drained, and immersed in 2 liters of fresh 96% ethanol; after 1 hour, the moisture content of each phase had reached equilibrium at about 7% by weight.

The meat pieces were then removed from the ethanol, drained and dried to about 5% by weight moisture content in a current of air at 20°C.

The product had an unshrunken, open texture and was resistant to fragmentation during handling, and it readily rehydrated in hot or cold water and in sauces and gravies to give a rehydrated product of good eating texture and flavour.

EXAMPLE 2

This Example illustrates the dehydration of raw potato chips.

Potatoes were peeled, washed and sliced into chips approximately 1 cm × 1 cm × 10 cm. Surface moisture was removed from the chips with an absorbent cloth, and they were frozen by putting them in a freezer cabinet at −20°C. (Microscope examination of sections of these chips showed that the slow freezing had produced large intercellular ice crystals.)

The frozen potato chips (1,000 g) were immersed in rectified ethanol (3,000 ml) at −15°C, and the mixture was maintained at that temperature in a temperature controlled bath with continuous stirring for 60 minutes. (Microscope examination showed that the potato cells retained their shape as the ice dissolved in and was replaced by ethanol.)

The transfer of water from the chips to the ethanol was followed by measuring by hydrometer the increase in specific gravity of the ethanol as it became diluted by ice dissolved from the chips. There was no further increase (i.e., equilibrium was established) after 60 minutes. The moisture-diluted ethanol was then separated from the chips and put aside for treatment to recover the ethanol. 3 liters of fresh ethanol at −15°C was added to the chips and stirring was carried out as before until the moisture content of the chips had fallen to about 5%.

The supernatant ethanol-water mixture was finally decanted, and residual ethanol-water was removed from the potato chips by exposing them to a current of air at 50°C.

The dried potato chips were found to reconstitute in water in less than 1 minute, and could then be fried in hot fat to produce firm fried potato chips.

EXAMPLE 3

The procedure described in Example 2 was repeated with the differences that
  i. the potato chips were first cooked in steam for 10 minutes before immersion in the first portion of ethanol, and
  ii. the second portion of ethanol used was at ambient (15°C) temperature The dried cooked chips could be rapidly reconstituted in water and fried in hot fat to produce a good fried chip product.

EXAMPLE 4

This Example illustrates the dehydration of carrots, peas and beans.

Carrots were scraped, cut into slices 1 cm thick and frozen in a cabinet at −20°C. Spanish beans and peas (varieties of legume that often have large internal air spaces) were steeped in water to fill the spaces as far as possible, and these also were frozen at −20°C.

All these vegetables were then dehydrated by the procedure described in Example 2. The fried vegetables obtained reconstituted rapidly in water by virtue of their open texture. They were not case-hardened, although they had lost some of their colour as a result of extraction of alcohol-soluble pigments.

EXAMPLE 5

This Example illustrates the dehydration of raw meat.

The procedure described in Example 2 was repeated using raw beef steaks of dimensions about 10 cm × 10 cm × 1 cm.

The dried steaks were reconstituted in hot water for about 10 – 15 minutes and were then dried. The fried product was of good texture and appearance.

EXPERIMENT

This compares the procedure described in British Pat. No. 1,032,204 (Procedure A) with that of the present invention (B). The foodstuffs used for this purpose were sliced bacon and raw beef steaks.

Procedure A 100g bacon slices 3 – 4 mm thick and 100 g raw beef steaks 5 cm × 2.5 cm × 1.25 cm were each immersed in the unfrozen state in 8 liters of ethanol at −30°C, and moisture was allowed to equilibrate at that temperature with occasional agitation, but without changing the ethanol.

Procedure B

Bacon slices and raw beef steaks of dimensions and in amounts as in A were frozen to −20°C, and were then each immersed in 8 liters ethanol at −5°C. Moisture was allowed to equilibrate at −5°C with occasional agitation, but without changing the ethanol.

The times taken to reach equilibrium (in each case about 20% moisture by weight) were:

| Procedure A: | Bacon | 17 hours |
|---|---|---|
|  | Steak | 22 days |
| Procedure B: | Bacon | 5 minutes |
|  | Steak | 5 hours |

What is claimed is:

1. In a method of drying a foodstuff by immersing the foodstuff in ethanol in order to extract moisture from its interior by solution in the ethanol, and subsequently evaporating residual ethanol from the foodstuff, the improvement which consists in the step of immersing the foodstuff in the ethanol while the foodstuff is in the frozen state, and maintaining the temperature of both foodstuff and ethanol in the range −20°C to 0°C until at least half the moisture content of the foodstuff has been dissolved from it so as to produce a substantially unshrunkened product.

2. A method according to claim 1, wherein the foodstuff is at a temperature in the range −20° to −5°C when it is immersed in the ethanol.

* * * * *